Patented Dec. 3, 1940

2,223,724

UNITED STATES PATENT OFFICE 2,223,724

SHORTENING AND PROCESS OF PRODUCING THE SAME

Truman M. Godfrey, Winchester, Mass., and Victor Serbell, Leonia, N. J., assignors to Lever Brothers Company, a corporation of Maine No Drawing. Application April 8, 1937, Serial No. 135,698

2 Claims. (Cl. 99—122)

The present invention relates to edible oleaginous materials, i. e., oils and fats, and processes of treating the same. More particularly the invention relates to the processing of shortenings to improve their flavor, stability and anti-rancidity properties, and in connection with edible oils and fats emulsified with a gas, to produce them in a condition in which the desired physical form of the product as originally produced is retained substantially permanently.

There are several general types of plastic shortenings. One type is the so-called compound type which is made from an edible liquid oil or soft fat blended with a sufficient proportion of a hard fat to give a final blended product of the desired plasticity. The blending takes place in a liquid condition and the resulting mixture is chilled to produce a semi-plastic fat which then, by a beating or picker operation, has air incorporated with it.

Another general type is made up primarily of oleaginous material of a desired plasticity. This may be either naturally occurring oleaginous material or oils or blends of oils which have been treated so as to produce the desired plasticity; for example by hydrogenating oil or blends of oils. The oleaginous material in liquid form is chilled to reduce it to a semi-plastic condition and also may have air mixed with it in a dispersed condition to give the material a white color and creamy texture.

Both of these types of products may be subjected to further finishing operations well known in the art.

These products may be made from oils and fats of the types of cottonseed, soya bean, sesame, peanut, kapok, cocoanut, palm, as well as many others, or mixtures thereof, depending upon the composition and plasticity particularly desired in the final product. Animal oils and fats, such as lard and lard compounds may be utilized in a similar manner.

In these types of products certain of the components of the oils are unsaturated chemically and thus are capable of combining or reacting with oxygen, for example, as well as other reactive substances available, to become rancid or develop a disagreeable odor or taste due to such reaction.

It has been found that oils and fats have the property of dissolving gases. For example, cottonseed, kapok, peanut and cocoanut oils at a temperature of 30° C. are capable of dissolving from 7.5 to 9% by volume of air.

In the processes of treating oils and fats as generally practiced in the art, no attempt is made to prevent them from coming in contact with the air during processing and thus the finished shortening contains a substantial amount of dissolved air. With respect to the air dissolved, therefore, conditions are particularly favorable for reaction between the unsaturated components of the shortening and the reactive components of the air.

Conditions are only somewhat less favorable for undesirable reactions between the unsaturated components of the shortennig and the reactive components of the air dispersed in the form of small bubbles throughout the body of the plastic shortening as the result of the picker or beating operating, which air may be referred to as being in an "occluded" form.

The characteristics of these oils or fats which permit them to absorb and dissolve gases is also of a disadvantage, in that they tend to absorb and become contaminated with malodorous substances, as well as those substances which tend to give the product an undesirable taste. Such substances may be carried by the air with which the oil or fat is in contact.

The shortening as it is usually packaged does not completely fill the container and, as a result, there is a space which is filled with air between the upper surface of the shortening and the container cover. The surface of the shortening, therefore, even before the container is opened, is exposed to a reactive substance in the air and one which may also be carrying undesirable odors and tastes which would be absorbed.

It will be seen, therefore, that the shortening in such processes may come in contact with air in three ways, namely, dissolved, occluded and surface contact, and in each instance unfortunate results may be obtained in view of undesirable reaction products produced and undesirable substances absorbed.

In addition to the above, there is still a further disadvantage in the presence of a reactive gas in contact in any form with a shortening, particularly of the emulsified type having gas thoroughly dispersed throughout the plastic mass. The reason for this apparently is based upon the phenomena of surface tension of the fat which causes a coalescing action within the body of the fat around each particle of occluded gas dispersed throughout the mass tending to force it into a dissolved condition within the fat. As a result the emulsified fat is found in many cases to lose its desirable emulsified or occluded air and revert to the greasy semi-transparent appearance characteristic of an unemulsified fat. These factors are subsequently discussed in greater detail.

It is one of the objects of our invention to overcome the disadvantages of the processes, and of shortenings produced by the generally used methods as indicated above.

It is also an object of our invention to produce a product which retains its original desirable chemical form, taste and odor.

It is an additional object of our invention to produce an emulsified shortening product which retains its original white color and smooth creamy texture.

An attempt has been made to improve the keeping qualities of a shortening by utilizing an inert gas, such as nitrogen, as the occluded gas by carrying out the beating or picker operation in an atmosphere of nitrogen. However, this operation is in no way effective to prevent the reaction between the dissolved reactive gas and the shortening, the dissolved reactive gas being, as a matter of fact, in a more effective reactive condition than the occluded gas. Also such an operation makes no solution of the problem of absorption by the fat of further undesirable components and particularly does not overcome the problem of maintaining the finished shortening in its desirable emulsified form.

We have found that all of these problems may be overcome and a desired stable product obtained, both as to chemical composition and physical form, by removing from the shortening while in a liquid condition the dissolved gases and foreign odors and tastes, and substantially saturating the same with an inert, odorless gas before it comes in contact with undesirable substances capable of being absorbed. Also, in connection with an emulsified shortening product having a gas dispersed throughout, we preferably utilize an inert, odorless gas for this occluded form. Also, preferably, in order to obtain the desired stability in my product after packing, we blanket the shortening in the container with a single inert gas which preferably is of the same kind as the predominant dissolved and occluded gas. The significance of this single blanketing gas is subsequently pointed out in detail.

As an illustration of a process utilizing our invention, the oil or fat constituting the shortening is deodorized after any refining, hydrogenating or blending steps, or combination thereof. This may be carried out by heating the oil or fat to a temperature ranging from 125° C. to 250° C., preferably at about 200° C. and then blowing deaerated super-heated steam or any other suitable gas through the same at a low pressure, for example a vacuum of from 2 to 6 mm. absolute. The deodorization completely removes any foreign odors which the shortening may have picked up and reduces the free fatty acid content to a minimum. This produces an odorless, sweet and neutral shortening. The deodorization operation also removes all of the air or other gas dissolved in the shortening. It is thus in a condition to dissolve and saturate itself with the first gas it contacts after the vacuum deodorizing operation. The shortening is then introduced into an atmosphere of an odorless inactive gas, preferably nitrogen. This is a very effective and very convenient manner of saturating the shortening with an inert gas. It also renders it unnecessary to displace any previously dissolved gases as a separate step in the process, which may however, be done if necessary. This operation permits in addition, the introduction of the inert gas at a time when the shortening is in a very pure state, i. e., immediately after any impurities or products of decomposition have been eliminated during the deodorization. As a result the shortening is not only initially free from impurities, but is in a condition such that impurities will not be formed.

The shortening, immediately after the vacuum deodorization, has not only the capacity to absorb and dissolve gases, but has a great affinity for objectionable foreign odors which are often present in refining and shortening processing plants. It has been found that this treatment of the deodorized shortening with an inert gas greatly reduces the tendency of the oils or fats to absorb objectionable odors.

The rate of the chemical reaction between oxygen and the unsaturated compounds in the shortening is greatly increased at higher temperatures and the introduction of the inert gas at this particular time has the added advantage of preventing the shortening from contacting oxygen at a time when it will have a relatively high temperature. This eliminates the formation of decomposition products, which otherwise would be rapidly formed at this time if the shortening were permitted to contact the air.

In accordance with a specific embodiment of the invention, the oil or fat constituting the shortening at the conclusion of the deodorization, is pumped from the deodorizer through a cooler where it is cooled to a temperature of about 25 to 60° C. The pump, cooler and interconnecting pipe lines are all flushed with nitrogen in order to eliminate any air therefrom. The cooling operation takes place in an atmosphere of nitrogen and the cooled oil or fat is then placed in the tank under a slight pressure of nitrogen. The oil or fat may be subjected to a filtering operation under pressure of nitrogen in a closed filter from which the air has been removed by flushing with nitrogen. The shortening is then pumped to a storage tank. Here it may be subjected to further treatment with nitrogen under pressure, for example, by bubbling nitrogen through the same. If the oil or fat previously was unsaturated with nitrogen, or if the pressure is increased, an additional amount of nitrogen will be dissolved. The shortening is then pumped under pressure to a storage tank where it is maintained under a slight pressure of nitrogen. From this tank it may be withdrawn for solidifying and finishing operations. All of the pipe lines, tanks and other apparatus through which the shortening passes, after deodorization and until and including the storage of the same, are preferably flushed with nitrogen to eliminate the air before the shortening is put into them. In most instances the inert gas is maintained under a slight pressure in contact with the shortening in order to minimize the possibility of air entering the apparatus and also to increase the quantity of nitrogen dissolved in the oil or fat over that which may be dissolved at atmospheric pressure.

If the shortening is liquid at ordinary temperatures, it may then be packed.

If the shortening is comprised of suitable constituents, it may be withdrawn from the storage tank and subjected to conventional chilling and finishing operations.

It is preferred, however, to treat such a shortening containing the dissolved inert gas so as to beat gas into the chilled plastic fat, which dispersed or occluded gas is also inert. If the shortening is chilled to a plastic condition on a conventional chill roll and then introduced into a picker box or beater, the picker box and/or the chill roll may be enclosed by a suitable housing to facilitate the blanketing of the shortening with an atmosphere of an inert gas. The occluded gas thus beaten into the shortening by the picker operation will be inert.

A convenient method of solidifying the shortening and incorporating a gas therein consists in the use of an enclosed chilling and beating device comprising one or more closed tubes through which the shortening is passed. The interior of a tube is provided with suitable agitating or scraping means for agitating the fat as it passes through the tube. The outside of the tube is surrounded by a refrigerating medium. The shortening is therefore cooled, solidified and beaten as it passes through the tube. Nitrogen or any other inert gas may be introduced into the inlet end of the device and mixed or emulsified with the fat by the agitating means within the tube. Deodorized shortening saturated with a dissolved inert gas may be withdrawn from the storage tank and introduced into this device without contact with the air. In this manner all of the dissolved and occluded gas will be an inert gas, and the shortening will not have been in contact with air from the time of deodorization until after solidification and finishing for packing.

The amount of gas dissolved in the shortening after the deodorization is dependent in some degree upon the time of contact of the shortening and gas, as well as upon the pressure of the gas. The rate of solution of the gas, as the shortening approaches complete saturation, is much slower than when the shortening is comparatively unsaturated with gas. It is, therefore, possible that the shortening may not be saturated with dissolved gas at the time it is subjected to the picker or beating operation.

The amount of gas dissolved in the shortening and the rate at which it dissolves is a function of the pressure of the gas. If the pressure is raised above atmospheric, it is possible to dissolve more gas in the shortening than at atmospheric pressure. Thus, if the shortening is not saturated with dissolved gas, it is desirable to have the inert gas available during the picker or beating operation, maintained under pressure, so that if the contact of the shortening with the inert gas has not been sufficient previously to saturate the shortening to a desired degree, a further saturation can be made to take place during the picker or beating operation. This operation can be carried out under pressure in the enclosed chilling and beating device described above and the pressure maintained is preferably that which is required to yield the desired amount of dissolved gas and occluded gas in the finished shortening when the pressure in the finished fat is reduced to atmospheric.

It is not necessary that the shortening be treated with nitrogen immediately after the deodorization provided all oxygen or other reactive or malodorous gases are excluded from the shortening until the fat is to be emulsified with a gas. The fat will be then unsaturated with gas and during the emulsification step the occluded inert gas and the dissolved gas may be incorporated at the same time.

The use of an inert gas for both the dissolved and occluded gaseous component in an emulsified shortening has the advantage that none of it is eliminated through chemical combination with the fat and the amount of occluded gas retained in the shortening, especially when the container is sealed, is greatly increased.

It is also desirable to pack the finished shortening, whether liquid or solid, in sealed containers in which the space between the surface of the shortening and the cover of the container is filled with an inert gas. Thus the surface and upper portion of the finished shortening is not subjected to continuous contact with the oxygen of the air or possible foreign odors and other substances carried by the air.

In addition to the avoidance of contact of a plastic emulsified shortening with harmful reactive and contaminating substances there are important physical factors involved which make it desirable to fill the container above such a shortening with an inert gas, preferably one which comprises the predominating proportion of the occluded and dissolved gases in the fat.

It has been observed that when shortening in which air is dissolved and occluded stands exposed to the air for some time, the shortening loses some of its whiteness. This results apparently from the fact that the occluded gas in the shortening has decreased in amount or disappeared entirely and thus the uniform dispersion of gas in the fat which gives it the desirable creamy white appearance is lost and the fat in its de-emulsified condition assumes the greasy semi-transparent appearance characteristic of unemulsified fat. A possible explanation is that the oxygen of the dissolved and occluded air reacts with the unsaturated fat compounds thus reducing the amount of dispersed air as well as the dissolved air. A portion of the remaining occluded oxygen of the air may dissolve to replace the oxygen originally dissolved but removed by reaction, thus further reducing the amount of gas occluded in the shortening.

The pressure on the remaining nitrogen and oxygen, if any, occluded in the shortening, is at least equal to the pressure of the atmosphere plus the additional pressure caused by the coalescing tendency of the fat owing to the surface tension of the shortening surrounding each minute quantity of occluded gas. This pressure causes the shortening to dissolve more occluded gas. The amount of gas dissolved is a function of the pressure and thus the pressure imposed on the gas within the body of the fat causes a greater amount to be dissolved than would be dissolved at atmospheric pressure. However, as the pressure at the surface is only atmospheric, the gas dissolved under the higher pressure is gradually released at the surface of the shortening into the lower pressure zone of the atmosphere; in time all of the occluded gas may be dissolved and released in this manner and the fat loses its emulsified characteristics.

The rate at which this action takes place when the shortening is exposed to the atmosphere will depend on the particular fat under consideration and the relative proportions of solid and liquid materials present in the shortening. The softer the shortening the greater will be the rate of separation. This rate will also depend to a certain extent on the size of the occluded gas bubbles and in general the smaller the bubbles the greater the rate of separation.

In sealed containers, however, the breakdown of the dispersion of the gas in the fat and the loss from the fat of the occluded gas by the action described above is not so complete, because of the fact that the gas in the occluded bubbles which is dissolved in the fat, and released at the surface of the shortening, increases the pressure of the gas in the sealed space above the shortening. Generally speaking, as soon as this pressure reaches the point where it is equal to the pressure on the occluded bubbles of gas, no further de-emulsification of the shortening will take place. In a sealed container the effect of the plasticity of the shortening or the size of the occluded gas bubbles on the de-emulsifying action will have less effect. In shortening that is exposed to the atmosphere there is a minimum size to which the gas bubbles can be reduced without undue de-emulsification and loss of whiteness. In a closed container it would be possible to reduce the gas bubbles to a smaller size and thereby improve the product without encountering a deleterious action due to de-emulsification.

This de-emulsifying action may be more completely eliminated or at least materially diminished, in addition to sealing the space between the upper surface of the fat and the top of the container, by filling the sealed space with an inert gas of the same kind as the dissolved and occluded gas in the fat, or at least of the same kind as the predominant portion of the dissolved and occluded gas. For example, if air is the dissolved and occluded gas, it is preferred to use nitrogen as the inert gas above the fat in the container, inasmuch as the air is predominantly nitrogen. The same would be true if nitrogen were the dissolved gas and air the occluded gas or if nitrogen were both the dissolved and occluded gas. However, if carbon dioxide is the dissolved and occluded gas, it is preferred to have carbon dioxide as the inert gas above the fat.

It has been found that in using the gases in the relationship just described, there is obtained an improved emulsified fat product of more stable characteristics and desirable appearance. This improvement in the emulsified fat is greater than would be expected from a mere elimination of a reactive gas, such as air, from contact with the surface of the shortening. The reason for this improved result is apparently closely associated with the particular physical properties of the product, namely, a plastic fat having gas bubbles dispersed throughout.

The action taking place within the body of the fat, even though it has an inert blanketing gas of the same kind as the predominant gas in the fat, is the same as that described in connection with the open container; that is, there is a tendency for the occluded gas to be forced into the fat in a dissolved condition because of the coalescing action resulting from the surface tension of the fat surrounding each minute quantity of occluded gas, and to be released from the surface of the shortening. However, by the use of an inert gas of the type described, in the sealed space not occupied by the fat in the container, it is possible to minimize this releasing action over and above that which would be obtained if the space were sealed with air or a mixture of gases. From the law of partial pressures it is known that the total pressure of a mixture of gases is equal to the sum of the component pressures of the individual gases comprising the mixture. If, therefore, the space above the fat is filled with a single gas of the same type as the predominant gas dissolved and occluded in the fat, equilibrium conditions between the pressure of the single gas above the shortening and the pressure on the occluded bubbles in the shortening will be reached more rapidly than would be the case if the sealed space were filled with a mixture of gases. As soon as this equilibrium is reached, the release of the dissolved gas at the surface of the shortening will equal that being dissolved, and there will be no further change or diminishment of the amount of dispersion of gas within the fat. For example, if the dissolved and occluded gas is nitrogen and the gas sealed above the space and the gas in the sealed space is nitrogen, the transfer of the occluded gas to a dissolved condition and its subsequent release from the surface will be much less than would be the case if the sealed space were filled with air, for the reason that the release of the dissolved nitrogen from the surface of the fat would immediately cause a proportional increase in the pressure of nitrogen in the sealed space which would equalize the pressure forcing the occluded nitrogen into solution within the fat. If the gas in the sealed space were air instead of nitrogen, a greater amount of occluded nitrogen would have to be released in order for the partial pressure of the nitrogen in the air in the sealed space to equal the pressure on the occluded nitrogen bubbles.

If the dissolved and occluded gas in the fat is air and the gas in the space above the fat is nitrogen, the oxygen in the dissolved and occluded air will tend to be released from the fat because there is no oxygen in the nitrogen in the space above the fat. The pressure of the nitrogen in the dissolved and occluded air will be less than the pressure of the pure nitrogen in the space above the fat, and there will be a tendency, due to this difference, for the nitrogen in the free space to pass into the dissolved and occluded portions. It will be apparent that less gas will have to be released to establish this equilibrium than if air were in the sealed space.

It can be seen, therefore, that the presence of the same inert gas in the sealed space above the shortening as the predominant gas in the dissolved or occluded form within the fat, minimizes the disappearance of the occluded gas within the fat to a greater extent than is the case if air were present above the fat, and that there is a definite relation and cooperation between the dissolved and occluded gas and the gas in the sealed space above the shortening.

While we have attempted to set forth above an explanation of the action of the gases employed in carrying out our process and producing the desired product, we do not wish our invention to be limited necessarily to any theory of operation, for such explanations are given only for the purpose of illustration and to facilitate the understanding of our invention.

In the above specification by the expression "inert gas" is meant any gas which will not react with the fat and which will not impart undesirable flavors or odors. It is obvious that many gases other than those specifically mentioned are inert and all such are intended to be within the scope of the invention as set forth in the following claims.

We claim:

1. In a process of producing and packaging a dry, plastic shortening from oleaginous material which after deodorization is capable of dissolving a substantial portion of gas and of absorbing objectionable odors, and which contains unsaturated fatty compounds tending to react with oxygen to produce products imparting undesirable odors and tastes, the steps comprising deodorizing said material and removing the previously dissolved oxygen and other gases therefrom by passing steam through said material at an elevated temperature and reduced pressure, and thereafter before the deodorized and oxygen-free oleaginous material has had an opportunity to come in contact with oxygen and other gases and odors deleteriously affecting it, cooling the oleaginous material to a temperature above its cangealing point and while it is still in a liquid state contacting it in an atmosphere of nitrogen which becomes dissolved in the oleaginous material thereby rendering it resistant to the absorption of objectionable odors and tastes and to such oxidation as normally occurs in oleaginous materials containing dissolved air, then chilling the said material to solidify the same and during said chilling introducing nitrogen and agitating said material whereby said nitrogen becomes occluded in the shortening in finely divided quantities, packaging the same in a sealed container in which not all of the space within the container is occupied by shortening, and introducing nitrogen into said space.

2. In a process of producing and packaging a dry, plastic shortening from oleaginous material which after deodorization is capable of dissolving a substantial portion of gas and of absorbing objectionable odors, and which contains unsaturated fatty compounds tending to react with oxygen to produce products imparted undesirable odors and tastes, the steps comprising deodorizing said material and removing the previously dissolved oxygen and other gases therefrom by passing steam through said material at an elevated temperature and reduced pressure, and thereafter before the deodorized and oxygen-free oleaginous material has had an opportunity to come in contact with oxygen and other gases and odors deleteriously affecting it, cooling the oleaginous material to a temperature above its congealing point and while it is still in a liquid state contacting it in an atmosphere of nitrogen which becomes dissolved in the oleaginous material thereby rendering it resistant to the absorption of objectionable odors and tastes and to such oxidation as normally occurs in oleaginous materials containing dissolved air, and then chilling the said material to solidify the same and during said chilling introducing nitrogen and agitating said material whereby said nitrogen becomes occluded in the shortening in finely divided quantities.

TRUMAN M. GODFREY.
VICTOR SERBELL.

CERTIFICATE OF CORRECTION.

Patent No. 2,223,724.   December 3, 1940.

TRUMAN M. GODFREY, ET AL.

It is hereby certified that error appears in the printed specification of the above numbered patent requiring correction as follows: Page 1, second column, line 12, for "shortennig" read --shortening--; line 16, for the word "operating" read --operation--; page 5, second column, line 5, claim 2, for "imparted" read --imparting--; and that the said Letters Patent should be read with this correction therein that the same may conform to the record of the case in the Patent Office.

Signed and sealed this 14th day of January, A. D. 1941.

(Seal)

Henry Van Arsdale,
Acting Commissioner of Patents.